United States Patent
Sotgiu

(10) Patent No.: US 9,227,473 B2
(45) Date of Patent: Jan. 5, 2016

(54) SYNCHRONIZATION OF TYRE BEAD BREAKER TOOLS

(75) Inventor: Paolo Sotgiu, Modena (IT)

(73) Assignee: SNAP-ON EQUIPMENT SRL A UNICO SOCIO, Correggio (RE) (IT)

(*) Notice: Subject to any disclaimer, the term of this patent is extended or adjusted under 35 U.S.C. 154(b) by 1128 days.

(21) Appl. No.: 13/252,653

(22) Filed: Oct. 4, 2011

(65) Prior Publication Data
US 2012/0097340 A1 Apr. 26, 2012

(30) Foreign Application Priority Data
Oct. 25, 2010 (EP) .................................... 10013945

(51) Int. Cl.
*B60C 25/135* (2006.01)
*B60C 25/138* (2006.01)
*B60C 25/05* (2006.01)

(52) U.S. Cl.
CPC ........... *B60C 25/138* (2013.01); *B60C 25/0551* (2013.04)

(58) Field of Classification Search
CPC .... B60C 25/132; B60C 25/138; B60C 25/05; B60C 25/0512; B60C 25/0515; B60C 25/0521; B60C 25/0548; B60C 25/0551; B60C 25/0554; B60C 25/0557; B60C 25/056; B60C 25/0563; B60C 25/059; B60B 31/005
USPC .......................... 157/1, 1.17, 1.24, 1.26, 1.28
See application file for complete search history.

(56) References Cited

U.S. PATENT DOCUMENTS

| 5,226,465 A * | 7/1993 | Schon et al. ................. 157/1.28 |
| 8,387,675 B1 * | 3/2013 | Vaninger et al. ............. 157/1.24 |
| 8,770,254 B1 * | 7/2014 | Hanneken et al. ........... 157/1.17 |

FOREIGN PATENT DOCUMENTS

| EP | 0 499 825 A1 | 8/1992 |
| EP | 2 110 270 A1 | 10/2009 |

* cited by examiner

*Primary Examiner* — Monica Carter
*Assistant Examiner* — Melanie Alexander
(74) *Attorney, Agent, or Firm* — McDermott Will & Emery LLP

(57) ABSTRACT

An apparatus and a method for synchronously moving first and second fitting or removal tools (300, 400) of a tire fitting or removing apparatus. When an operator moves the first fitting or removal tool (300) in a substantially radial direction with respect to a longitudinal axis (L) of a post (210) supporting the first and second fitting or removal tools (300, 400), a synchronization unit receives first and second input signals of first and second sensors (320, 420) coupled to the first and second fitting or removal tools (300, 400) and indicating a radial movement or position of the tools (300, 400). The synchronization unit generates, based on a comparison of the first and second input signals, an output signal causing an actuator (450) to move the second fitting or removal tool (400) synchronous to the first fitting or removal tool (300) in said substantially radial direction.

15 Claims, 5 Drawing Sheets

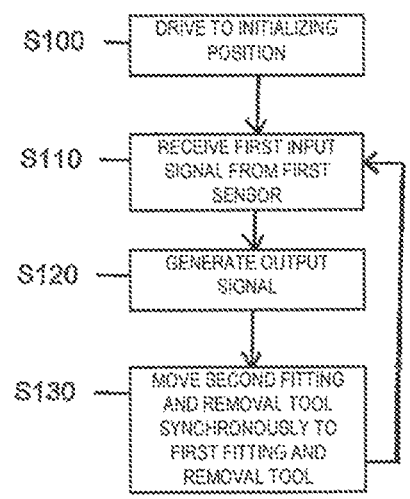
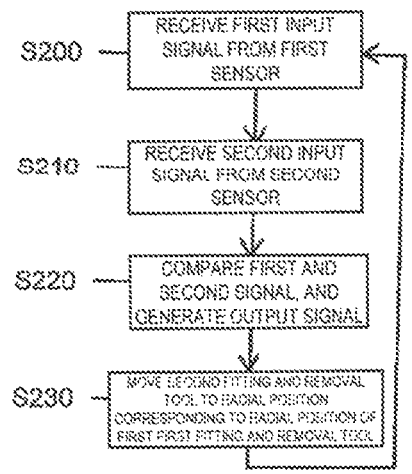

SYNCHRONIZATION OF TYRE BEAD BREAKER TOOLS

FIELD OF THE INVENTION

The present invention relates to an apparatus and a method for fitting or removing a tyre onto or from a vehicle wheel rim according to the preambles of claims 1 and 14. In particular, the invention relates to an apparatus for fitting a tyre onto a rim of a vehicle wheel and for removing a tyre from a rim of a vehicle wheel, and a method for synchronously moving first and second fitting or removal tools of a tyre fitting and removing apparatus.

For fitting or removing a tyre onto a wheel rim or from a wheel rim of a motor vehicle, respectively, fitting or removal tools are used, amongst others, to move the tyre or parts of the tyre with respect to the rim. A tyre fitting or removing apparatus comprises a vehicle wheel receiving means and at least one fitting or removal tool for fitting or removing the tyre onto or from the rim of the vehicle wheel. One such fitting or removal tool is a bead breaker tool, for example, which is used for moving the bead of a tyre away from a rim edge (i.e. out of a bead seat) of the wheel rim toward the rim well. This operation is called bead breaking. For this bead breaking operation, usually strong forces are to be applied and an exact positioning of the fitting or removal tools is required in order to be able to release the bead from the rim edge at all. Moreover, a contact of the fitting or removal tools with the rim has to be avoided in order to beware damage of the relative weak materials or surfaces of a rim by the hard materials of the fitting or removal tools. For a simultaneous removal of the beads of both sides of a tyre from the rim edges (out of their respective bead seats), two fitting or removal tools can be used simultaneously.

BACKGROUND ART

EP 2 110 270 A1 shows a method and an apparatus for fitting a tyre onto a vehicle wheel rim or removing a tyre from a vehicle wheel rim. At least one fitting or removal tool is moved parallel to the axis of the vehicle wheel, while the vehicle wheel is moved radially to the axis of the wheel by means of a drive device in order to bring the wheel into the right position with respect to the at least one fitting or removal tool.

The configuration shown in EP 2 110 270 A1 has the disadvantage that the mechanism for radial moving the vehicle wheel has to support the wheel receiving means and a driving means for rotating the wheel, and additionally has to bear strong forces applied to the wheel during tyre fitting or removing operations. This requires a robust and expensive mechanism for performing the radial movement of the wheel.

It is an object of the present invention to provide a method and an apparatus for a more simple, cost effective and convenient simultaneous positioning of at least two fitting or removal tools of a tire fitting or removing apparatus with respect to a vehicle wheel.

This object is achieved by an a apparatus according to claim 1 and a method according to claim 14 of the present invention.

SUMMARY OF THE INVENTION

The invention provides an apparatus for fitting a tyre onto a rim of a vehicle wheel and for removing a tyre from a rim of a vehicle wheel.

In a first embodiment, the apparatus for fitting a tyre onto a rim of a vehicle wheel and for removing a tyre from a rim of a vehicle wheel comprises a base having a receiving means for receiving and at least rotationally moving a wheel, a frame coupled to the base and having post with a longitudinal axis parallel to a rotational axis of the received wheel, a first fitting or removal tool and a second fitting or removal tool which are supported by the post, wherein the first and second fitting or removal tools are movable at least in an axial direction and a substantially radial direction with respect to the longitudinal axis of the post, a first sensor coupled to the first fitting or removal tool and adapted to detect the movement of the first fitting or removal tool in said substantially radial direction, an actuator coupled to the second fitting or removal tool and adapted to move the second fitting or removal tool in said substantially radial direction, and a synchronization unit adapted to receive a first input signal from the first sensor indicating a movement or position of the first fitting or removal tool in said substantially radial direction, and provide, based on the first input signal, an output signal causing the actuator to move the second fitting or removal tool synchronously to the first fitting or removal tool in said substantially radial direction.

An advantage of the apparatus according to the first embodiment of the invention is that a receiving means carrying the wheel to be treated does not have to be moved in a radial direction of the wheel so that no expensive radial moving mechanism for the wheel receiving means is required, while a simple and convenient operation of synchronously moving the first and second fitting or removal tools relative to the wheel can be obtained. Thus, costs of the tyre fitting or removing apparatus can be reduced and reliability of the apparatus can be improved, while an operator is able to perform an efficient and convenient operation for fitting or removing a tyre onto or from a wheel rim.

In another embodiment of the invention, the apparatus further comprises at least one first driving means adapted to move the first and second fitting or removal tools in said axial direction. The at least one first driving means can be a pneumatic or hydraulic driving means and can be controlled manually by an operator.

In another embodiment, the apparatus further comprises a controlling unit adapted to control at least the rotational movement of the wheel. In this case, the controlling unit can automatically control the at least one first driving means.

In another embodiment of the invention, the apparatus further comprises a second sensor coupled to the second fitting or removal tool and adapted to detect the movement of the second fitting or removal tool in said radial direction, wherein the synchronization unit is further adapted to receive a second input signal from the second sensor indicating a movement or position of the second fitting or removal tool in said substantially radial direction, and provide the output signal based on a comparison of the first and second input signals.

The first sensor coupled to the first fitting or removal tool and/or the second sensor coupled to the second fitting or removal tool can be a potentiometer. Other types of sensors can be used, too, such as optical sensors or electromagnetic sensors or other sensors able to detect a movement or position of the fitting or removal tools.

The first fitting or removal tool can be manually driven in the substantially radial direction. Alternatively, it can be driven by another actuator which can be manually controlled by an operator or automatically controlled by a controlling unit.

In another embodiment of the invention, at least the first fitting or removal tool of the first and second fitting or removal tools can be manually pivoted in a plane substantially perpendicular to the longitudinal axis of the post. Alternatively, a second driving means can be provided to pivot at least the first fitting or removal tool of the first and second fitting or removal tools in a plane substantially perpendicular to the longitudinal axis of the post. The second driving means can be an electric motor, or a hydraulic or pneumatic drive, for example.

The apparatus can further comprise a controlling unit adapted to control at least the rotational movement of the wheel, wherein the synchronization unit can be integrated into the controlling unit. Alternatively, the synchronization unit can be provided as a separate unit connected to the apparatus.

According to an embodiment of the present invention, a method for synchronously moving first and second fitting or removal tools supported by a post of a tyre fitting and removing apparatus and being movable at least in a substantially radial direction with respect to a longitudinal axis of the post which extends parallel to a rotational axis of a vehicle wheel comprises the steps of receiving a first input signal from a first sensor coupled to the first fitting or removal tool, wherein the first input signal indicates a movement or position of the first fitting or removal tool in said substantially radial direction, and providing, based on the first input signal, an output signal causing an actuator coupled to the second fitting or removal tool to move the second fitting or removal tool synchronous to the first fitting or removal tool in said substantially radial direction.

An advantage of the method according to the embodiment of the present invention mentioned above is that an operator only has to move and observe a first fitting or removal tool of a tyre fitting or removing apparatus in order to place it in the right position with respect to a wheel to be treated, while a second fitting or removal tool of the apparatus is moved automatically and synchronously to the first fitting or removal tool to the right position with respect to the wheel, even if the operator is not able to see the second fitting or removal tool moving below the wheel. Moreover, no expensive and heavy mechanism for radially moving the wheel together with the whole wheel receiving means of the tyre fitting or removing apparatus is required. Thus, costs of the apparatus can be reduced and reliability of the apparatus can be improved, while a simple and convenient operation for fitting or removing a tyre onto or from a wheel rim can be obtained. In a further embodiment of the invention, the method further comprises the step of receiving a second input signal from a second sensor coupled to the second fitting or removal tool, wherein the second input signal indicates a movement or position of the second fitting or removal tool in said substantially radial direction, and wherein the output signal is provided based on a comparison of the first and second input signals.

BRIEF DESCRIPTION OF THE DRAWINGS

FIG. 5 is a flow chart representing a method for synchronously moving first and second fitting or removal tools according an embodiment of the present invention.

FIG. 6 is a flow chart representing another method for synchronously moving first and second fitting or removal tools according an embodiment of the present invention.

DETAILED DESCRIPTION OF PREFERRED EMBODIMENTS OF THE INVENTION

Figure 1:
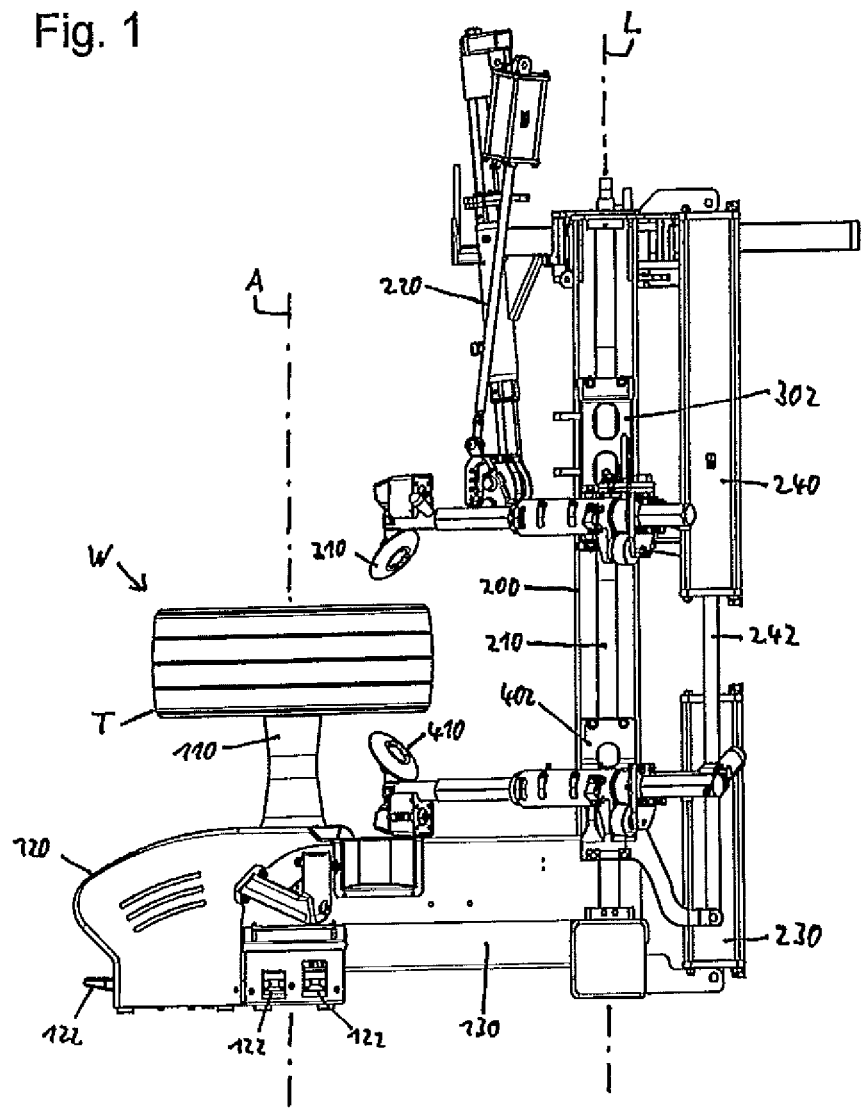
FIG. 1 is a side view of a tyre fitting or removing apparatus according to an embodiment of the present invention.
Figure 2:
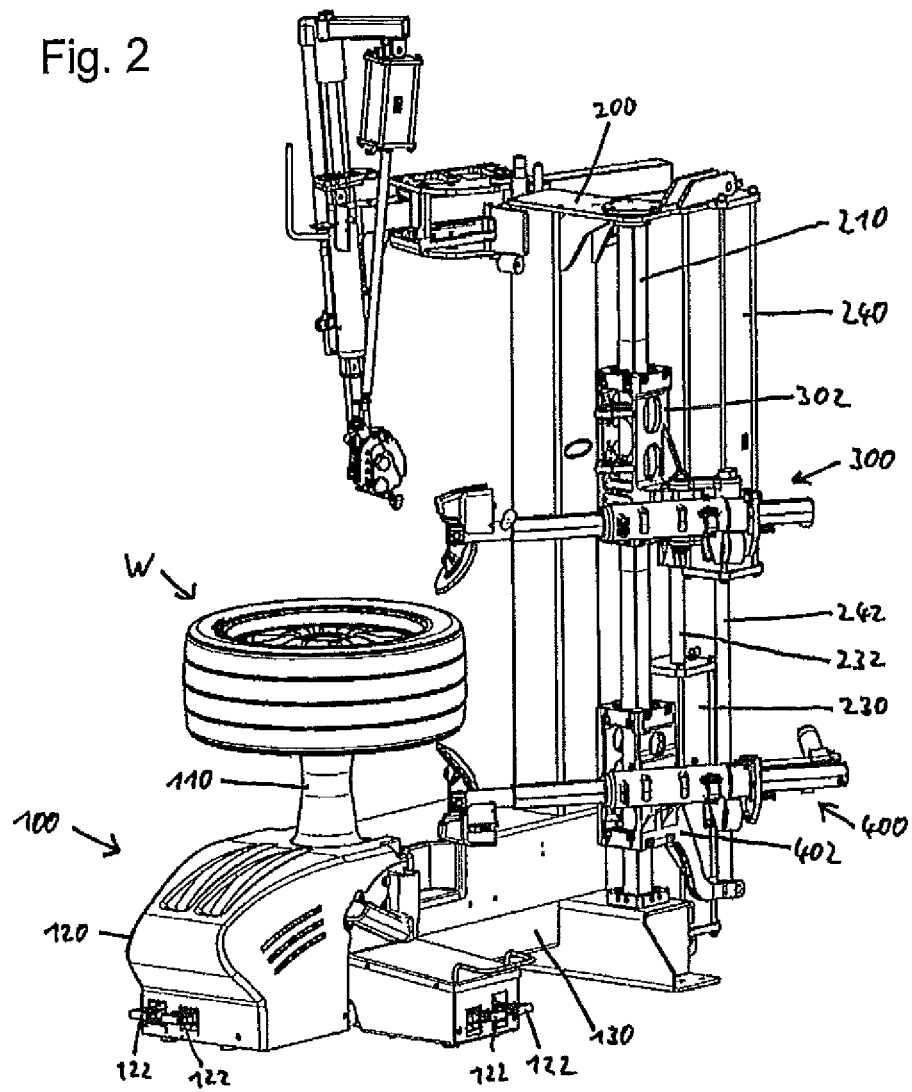
FIG. 2 is a perspective view of the tyre fitting or removing apparatus of FIG. 1.

FIG. 1 shows a side view of an apparatus for fitting a tyre T onto a rim R of a vehicle wheel W and or for removing a tyre T from a rim R of a vehicle wheel W according to a first embodiment of the present invention. FIG. 2 is a perspective view of the apparatus of FIG. 1.

Referring to FIG. 1, the tyre fitting or removing apparatus comprises a base 100 carrying a wheel receiving means having a rotatable shaft 110 with a vertical oriented rotational axis A, and a vertical frame 200 with a vertical post 210 carrying first and second fitting or removal tools 300, 400.

The base 100 comprises an operating unit 120 at its the front portion having at least one pedal 122 used by an operator to operate the tyre fitting or removing apparatus, and a base frame 130 extending backward (to the right in FIG. 1) from the operating unit and being coupled at its rear end to the vertical frame 200. The wheel receiving means is mounted to the front portion of the base 100 so as to allow good access to an operator, and comprises a rotatable shaft 110 with a flange plate (not shown) attached thereon, and a driving device (not shown) for rotating the shaft 110. The rotational axis A of the shaft 110 usually extends in vertical direction, but an inclined or horizontal orientation of the rotational axis is also possible. The flange plate of the wheel receiving means is used to receive and clamp a wheel flange of a rim R of a vehicle wheel W to be treated. The length of the base frame 130 is configured such that a distance between the rotatable shaft 110 and the frame 200 provides adequate space for receiving wheels W up to a desired size on the wheel receiving means. The shaft 110 can be rotated by the driving device (not shown) so as to rotate the rim R for performing operations of fitting or removing a tyre T onto or from the rim R, respectively. In some applications, it is advantageous to provide a mechanism for axially moving the receiving means or the shaft 110 relative to the base 100, as is described in EP 2 110 270 A1, for example.

The vertical frame 200 is mounted to the rear end (right end in FIG. 1) of the base frame 130 of the base 100 and comprises a vertical extending post 210, wherein the longitudinal axis of the post 210 extends parallel to the rotational axis of the wheel W or rim R received on the receiving means 100. This means that the longitudinal axis of the post 210 usually extends in a vertical direction as the rotational axis of the received wheel W, which is the rotary axis of the shaft 110, usually extends in vertical direction. If, however, the rotational axis of the shaft 110 is oriented in an inclined or horizontal direction then the longitudinal axis of the post 210 is oriented in the same direction. Further devices can be mounted to the frame 200, such as a third fitting or removal tool 220, for example.

Figure 3:
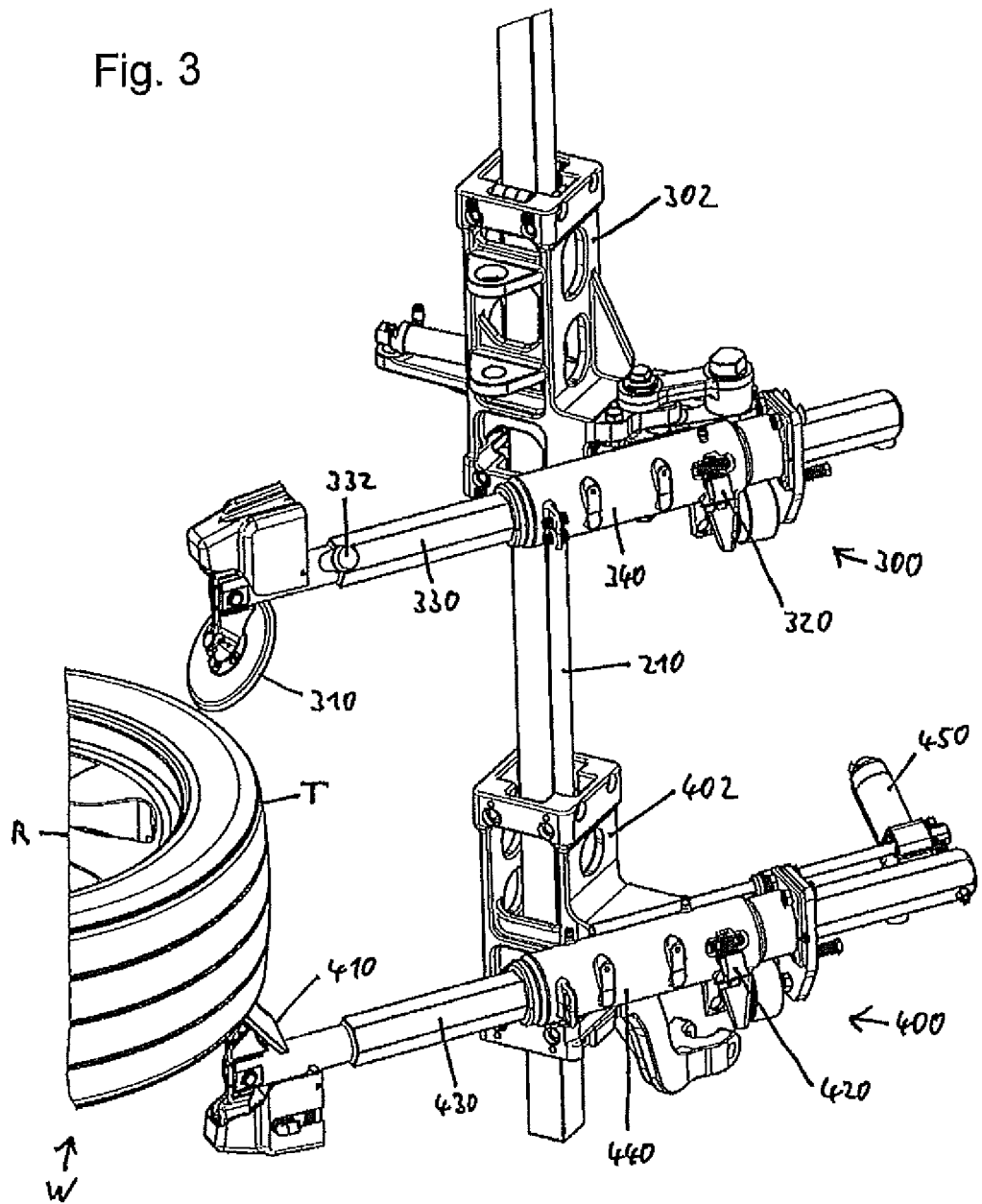
FIG. 3 is a perspective view of a portion of the tyre fitting or removing apparatus of FIG. 1.

FIG. 3 is a perspective view of the arrangement of a first fitting or removal tool 300 and a second fitting or removal tool 400 at the post 210 of the frame 200 of the tyre fitting and removing apparatus of FIGS. 1 and 2. In the depicted embodiment having a vertical rotational axis A of the wheel W, the first fitting or removal tool 300 is an upper fitting or removal tool arranged above a lower fitting or removal tool which is the second fitting or removal tool 400.

At least a first fitting or removal tool 300 and a second fitting or removal tool 400 are coupled to the post 210 by corresponding individual coupling elements 302, 402 which are able to slide along the post 210 so as to be at least movable along the frame 200 in an axial direction with respect to the longitudinal axis of the post 210 and, therefore, in an substantially axial direction of the wheel W received on the wheel receiving means.

The first and second coupling elements 302, 402 can be connected to respective first driving means 230, 240 via respective rods 232, 242 for moving the first and second fitting or removal tools 300, 400 in the axial direction with respect to the longitudinal axis of the post 210. The first driving means 230, 240 are mounted to the frame 200 and can comprise any kind of linear driving means, such as electric motors with a spindle drive or a rack and pinion mechanism or, preferably, hydraulic or pneumatic cylinders as shown in the drawings. The first driving means 230, 240 provide the strong forces required to perform the bead breaking operation. It is also possible to provide only on first driving means for moving the first and second fitting or removal tools 300, 400. In this case, the first driving means simultaneously moves both fitting or removal tools 300, 400 (i.e. the coupling elements 302, 402) in opposite directions via a symmetric driving mechanism. In case of two first driving means 230, 240, one of the first driving means 230 is coupled to the first fitting or removal tool 300 via the rod 232 and the coupling element 302, while the other first driving means 240 is coupled to the second fitting or removal tool 400 via the rod 242 and the second coupling element 402.

The coupling element 302 can support the first fitting or removal tool 300 in such a manner that it is pivotable in a plane at least substantially perpendicular to the longitudinal axis of the post 210 (usually a horizontal plane). Thus, the fitting or removal tool 300 can pivot away from its operating position in order to facilitate mounting or removing a wheel onto or from the wheel receiving means. This pivotal movement of the first fitting or removal tool 300 can be caused manually via a hand knob 332 mounted at a position near a distal end of the first fitting or removal tool 300, or by a second driving means. The second driving means can comprise an electric motor or a hydraulic or pneumatic driving device for example (not shown).

In a further embodiment of the invention, both coupling elements 302, 402 can support the respective fitting or removal tool 300, 400 in a pivotable manner as described above. The pivotal movement of the second fitting or removal tool 400 can be caused by another hand knob (not shown) mounted near the distal end of the second fitting or removal tool 400 or a further second driving means. Alternatively, the first and second fitting or removal tool 300, 400 can be coupled to each other by a coupling mechanism (not shown) so that they are pivoted synchronously if the first fitting or removal tool 300 is pivoted. In another embodiment, the post 210 can be mounted rotatable around its longitudinal axis to the frame 200, while the coupling means 302, 402 support the first and second fitting or removal tools 300, 400 rotatably fixed with respect to the post 210 so that a synchronous pivoting of both fitting or removal tools 300, 400 is obtained without requiring an additional coupling mechanism between them. However, it is also possible that the fitting or removal tools 300, 400 are mounted pivotably fixed with respect to longitudinal axis of the post 210.

The fitting or removal tools 300, 400 comprise first and second arms 330, 430 sliding in a substantially radial direction with respect to the longitudinal axis of the post 210 along respective first and second guidings 340, 440 mounted to the respective coupling elements 302, 402. The sliding of the arms 330, 430 is restricted by respective stops so that the arms 330, 430 cannot be dislodged from the guidings 340, 440. First and second bead breaker discs 310, 410 are mounted in an inclined position at the distal ends of first and second arms 330, 430, respectively. The first and second bead breaker discs 310, 410 are the tool elements acting on the tyre and are to be positioned exactly before the bead breaking operation. Thus, the fitting or removal tools 300, 400 and the first and second bead breaker discs 310, 410, respectively, can be moved at least in a direction axial and in a direction substantially radial with respect to the longitudinal axis of the post 210.

In this regard it is to be noted that in the embodiments depicted in the drawings the longitudinal axes of the first and second fitting or removal tools 300, 400, which are equal to the respective longitudinal axes of the first and second arms 330, 430, do not intersect with the longitudinal axis of the post 210. Rather, the axes of the arms 330, 430 pass the longitudinal axis of the post 210 in a short distance so that the arms 330, 430 do not extend exactly radial with respect to the longitudinal axis of the post 210. However, embodiments with these axes intersecting the longitudinal axis of the post 210 are also possible if, for example, each of the first and second arms 330, 430 comprises a kind of extendable device, a face side of which is coupled to the post 210. Therefore, the term "radial direction" also has to be interpreted as "substantial radial direction", even if not explicitly explained. Accordingly, the term "radial movement" also has to be interpreted as "substantial radial movement". Further it is to be noted, that the longitudinal axis of the first and second fitting or removal tools 300, 400 extend in a substantially radial direction with respect to the wheel W received on the wheel receiving means if the first and second fitting or removal tools 300, 400 reside in their operating positions.

A first sensor 320 is coupled to the first fitting or removal tool 300. The first sensor 320 is located at the first guiding 340, as is shown in FIG. 3 for example, and is adapted to detect a sliding movement of the first arm 330 of the first fitting or removal tool 300 along the guiding 340. The first sensor 320 can be a potentiometer, for example, coupled via a rack and pinion mechanism to the first arm 330 and generating a first input signal indicating the movement of the first fitting or removal tool 300 (and the arm 330) in the substantially radial direction with respect to the longitudinal axis of the post 210. Other types of sensors can be used for the first sensor 320, such as optical sensors counting equally spaced markings on the slidable arm 330, or electro-magnetic sensors counting protrusions arranged at the arm 330. Moreover, every other type of sensor can be used as long as it is able to generate a signal giving an indication of the sliding movement or position of the arm 330. The first input signal generated by the first sensor 320 can represent an absolute position (extension) of the arm 330, such as a voltage being proportional to that position and created by a potentiometer for example. Alternatively, the first input signal can represent a moving distance of the arm 330, such as a counting signal created by an optical sensor counting markings as mentioned above. Then the absolute position of the fitting or removal tool can be determined by an initializing procedure proving a known starting position and continuously observing counting values of the signal corresponding to the moving distances of the tool.

An actuator 450 is coupled to the end of the second fitting or removal tool 400 opposite to the second bead breaker disc 410. The actuator 450 also can be arranged at other location of the fitting or removal tool 400 such as the guiding 440, and is adapted to drive the slidable arm 430 via a corresponding mechanism in order to move the second fitting or removal tool 400 (the arm 430, respectively) in a substantially radial direction with respect to the longitudinal axis of the post 210. The actuator 450 preferably comprises an electric motor moving the arm 430 via a spindle drive or some other kind of linear actuator. The actuator 450 can be a stepper motor, for example, or some other kind of actuator that provides a counting signal or a position signal. In this case, a sliding position of the second arm 440 and the second fitting or removal tool 400 relative to the guiding 440 can be determined on the basis a number of steps performed by a stepper motor or on the basis of a counting or position signal provided by such other kind of actuator. Other types of linear actuators suitable for driving the second arm 440 are well known to a skilled person, such as hydraulic or pneumatic cylinders for example, or other types of electric motors, but require an additional sensor to determine the movement or position of the second arm 440, as is described later.

A synchronization unit 500 (shown in FIG. 4) is connected at least to the first sensor 320 and the actuator 450. The synchronization unit 500 can be provided to the tyre fitting or removing apparatus as a separate unit or can be integrated into a controlling unit (not shown) adapted to control at least the rotational movement of the wheel W. The controlling unit can be incorporated in the operating unit 120, for example.

The synchronization unit 500 comprises a power supply for providing driving power to the actuator 450, and a controller for receiving the first input signal from the first sensor 320 and providing an output signal that causes the actuator 450 to perform a controlled radial sliding movement of the second arm 430 relative to the guiding 440. The output signal can be transmitted to the power supply or another means in order to control the power provided to the actuator 450. In other words, the synchronization unit 500 receives the first input signal indicating a radial movement or position of the first fitting or removal tool 300 and controls the movement of the second fitting or removal tool 400 in such a manner that the second fitting or removal tool 400 performs a substantially radial movement with respect to the longitudinal axis of the post 210 synchronous with the radial movement of the first fitting or removal tool 300. In this manner the second fitting or removal tool 400 can be automatically positioned at the same radial distance with respect to the longitudinal axis of the post 210 as the first fitting or removal tool 300 so that the first and second bead breaker discs 310, 410 of the first and second fitting or removal tools 300, 400 are positioned with the same radial distance to the wheel rim R. The hand knob 332 of the first fitting or removal tool 300 can be used for manually driving the latter in the substantially radial direction with respect to the longitudinal axis of the post 210. When the first fitting or removal tool 300 is manually moved by an operator in radial direction with respect to the longitudinal axis of the post 210, the second fitting or removal tool 400 follows this movement automatically, so that the operator can easily move both fitting or removal tools 300, 400 into the correct position in a single convenient operation even if he is not able to observe the second roller 410 of the second fitting or removal tool 400 when arranged under the vehicle wheel W received on the wheel receiving means.

If the actuator 450 is a stepper motor, as mentioned above, the controller of the synchronization unit 500 provides an output signal having a suitable number of motor steps depending on the received first input signal from the first sensor 320 so that the arm 430 and the second fitting or removal tool 400, respectively, is moved in accordance with the detected movement of the first fitting or removal tool 300. In this case, there is no need to provide a device for sensing the movement or position of the second fitting or removal tool 400. During start up of the apparatus or by command of a operator, the second arm 430 can be driven by the stepper motor 450 to a stop or a position switch at an initial position of the arm 430 in order to calibrate the driving position of the second arm 430.

In another embodiment of the invention, the apparatus further comprises a second sensor 420 coupled to the second fitting or removal tool 400. The second sensor 420 is located at the second guiding 440, for example, and is adapted to detect a sliding movement of the second arm 430 of the second fitting or removal tool 400 along the second guiding 440. Preferably, the second sensor 420 is arranged in a similar manner and is of the same type as the first sensor 320. However, the second sensor 420 can be integrated in or attached to the actuator 450, too. The second sensor 420 generates a second input signal indicating the radial movement of the second arm 430 and the second fitting or removal tool 400, respectively.

Figure 4:
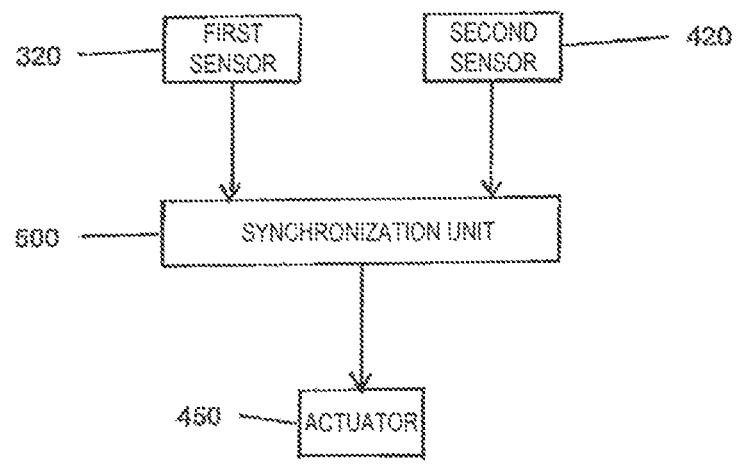
FIG. 4 is a block diagram of a tyre fitting or removing apparatus representing the functional relationship of the components according to an embodiment of the present invention.

As is shown in the block diagram of FIG. 4, the second input signal of the second sensor 420 and the first input signal from the first sensor 320 are provided to the synchronization unit 500. The controller of the synchronization unit 500 compares the second input signal to the first input signal and generates the output signal on the basis of the comparison of the first and second input signals, so that the output signal causes the actuator 450 to move the second fitting or removal tool 400 synchronous to the first fitting or removal tool 300.

In another embodiment of the present invention, the apparatus comprises a controlling unit adapted to control at least the rotational movement of the wheel W received at the receiving means 100. The controlling unit can further automatically control some or all of the other driving means, such as the first and second driving means or a driving means driving a third fitting or removal tool 220 used to pull or push the tyre over the edge of a rim. The controlling unit can receive commands from an operator via pedals 120, 122, 124 or switches, for example. Thus, the first and second driving means can be controlled manually by an operator operating the pedals 120, 122, 124 or switches. A direct connection of the pedals and switches to the first and second driving means without providing a controlling unit is also possible.

With respect to FIG. 5, an embodiment of a method for synchronously moving first and second fitting or removal tools 300, 400 of a tyre fitting or removing apparatus using a stepper motor for the actuator 450 according to the present invention is explained.

After start up of the tyre fitting or removing apparatus, the second fitting or removal tool 400 is driven to an initializing position by means of the actuator (stepper motor) 450 in step S100 so that the synchronization unit 500 knows the actual position of the second fitting or removal tool 400. In step S110, the synchronization unit 500 receives the first input signal from the first sensor 320 indicating the substantially radial position of the first fitting or removal tool 300. In step S120, the synchronization unit 500 generates the output signal representing a required number of motor steps of the stepper motor 450 to move the second fitting or removal tool 400 to a radial position corresponding to the radial position of the first fitting or removal tool 300. In step S130, the output signal causes the stepper motor 450 to perform the required number of motor steps to move the second fitting or removal tool 400 so that both fitting or removal tools 300, 400 are positioned in the same radial distance with respect to the longitudinal axis of the post 210 and, therefore, in the same radial distance with respect to the wheel rim R. The process then returns to step S110.

If, according to another embodiment of the invention, the first sensor 320 is an optical sensor, for example, counting optical markings on the arm 330 and providing a signal that indicates a relative movement instead of an absolute position of the first fitting or removal tool 300, then after start up a further initialization step is required between step S100 and S110 in order to initialize the position of the first fitting or removal tool 300. Otherwise the actual position of the first fitting or removal tool 300 would be unknown to the synchronization unit 500. It is well known in the art how to perform such a further initialization step by a position switch further coupled to the first fitting or removal tool 300, for example.

With respect to FIG. 6, another embodiment of a method for synchronously moving first and second fitting or removal tools 300, 400 of a tyre fitting or removing apparatus according to the present invention is explained.

In this embodiment, after start up of the tyre fitting or removing apparatus, the synchronization unit 500 receives the first input signal from the first sensor 320 indicating the substantially radial position of the first fitting or removal tool 300 with respect to the longitudinal axis of the post 210 in step S200. In step S210, the unit 500 receives the second input signal from the second sensor 420 indicating the substantially radial position of the second fitting or removal tool 400. In step S220, the synchronization unit 500 compares the first input signal and the second input signal and generates the output signal representing a desired movement of the second fitting or removal tool 400 in order to move it synchronously to the first fitting or removal tool 300. In step S230, the output signal causes the actuator 450 to move the second fitting or removal tool 400 to a radial position corresponding to the radial position of first fitting or removal tool 300 so that both fitting or removal tools 300, 400 are positioned in the same radial distance with respect to the longitudinal axis of the post 210 and, therefore, in the same radial distance with respect to the wheel rim R. The process then returns to step S200.

According to an apparatus and a method for synchronously moving first and second fitting or removal tools 300, 400 of a tyre fitting or removing apparatus, when an operator moves the first fitting or removal tool 300 in a substantially radial direction with respect to a longitudinal axis L of a post 210 supporting the first and second fitting or removal tools 300, 400, a synchronization unit receives first and second input signals of first and second sensors 320, 420 coupled to the first and second fitting or removal tools 300, 400 and indicating a radial movement or position of the tools 300, 400. The synchronization unit generates, based on a comparison of the first and second input signals, an output signal causing an actuator 450 to move the second fitting or removal tool 400 synchronous to the first fitting or removal tool 300 in said substantially radial direction.

The invention claimed is:

1. An apparatus for fitting a tyre onto a rim of a vehicle wheel and for removing a tyre from a rim of a vehicle wheel, comprising:
   a base having a receiving means for receiving and at least rotationally moving the wheel,
   a frame coupled to the base and having a post with a longitudinal axis parallel to a rotational axis of the received wheel,
   a first fitting or removal tool and a second fitting or removal tool which are supported by the post, wherein the first and second fitting or removal tools are movable at least in an axial direction and a substantially radial direction with respect to the longitudinal axis of the post, characterized by
   a first sensor coupled to the first fitting or removal tool and adapted to detect the movement of the first fitting or removal tool in said substantially radial direction,
   an actuator coupled to the second fitting or removal tool and adapted to move the second fitting or removal tool in said substantially radial direction, and
   a synchronization unit adapted to receive a first input signal from the first sensor indicating a movement or position of the first fitting or removal tool in said substantially radial direction, and provide, based on the first input signal, an output signal causing the actuator to move the second fitting or removal tool synchronously to the first fitting or removal tool in said substantially radial direction.

2. The apparatus according to claim 1, further comprising:
   at least one first driving means adapted to move the first and second fitting or removal tools in said axial direction.

3. The apparatus according to claim 2,
   wherein the at least one first driving means is a pneumatic or hydraulic driving means.

4. The apparatus according to claim 2,
   wherein the at least one first driving means is controlled manually.

5. The apparatus according to claim 2, further comprising:
   a controlling unit adapted to control at least the rotational movement of the wheel,
   wherein the at least one first driving means is controlled automatically by the controlling unit.

6. The apparatus according to claim 1,
   wherein the first sensor is a potentiometer.

7. The apparatus according to claim 1, further comprising:
   a second sensor coupled to the second fitting or removal tool and adapted to detect the movement of the second fitting or removal tool in said radial direction,
   wherein the synchronization unit is further adapted to receive a second input signal from the second sensor indicating a movement or position of the second fitting or removal tool in said substantially radial direction, and provide the output signal based on a comparison of the first and second input signals.

8. The apparatus according to claim 7,
   wherein the second sensor is a potentiometer.

9. The apparatus according to claim 1,
   wherein the first fitting or removal tool is manually drivable in said substantially radial direction.

10. The apparatus according to claim 1,
   wherein at least the first fitting or removal tool of the first and second fitting or removal tools is manually pivotable in a plane substantially perpendicular to the longitudinal axis of the post.

11. The apparatus according to claim 1, further comprising:
   a second driving means adapted to pivot at least the first fitting or removal tool of the first and second fitting or removal tools in a plane substantially perpendicular to the longitudinal axis of the post.

12. The apparatus according to claim 1, further comprising:
   a controlling unit adapted to control at least the rotational movement of the wheel, wherein the synchronization unit is integrated into the controlling unit.

13. The apparatus according to claim 1,
   wherein the synchronization unit is a separate unit connected to the apparatus.

14. A method for synchronously moving first and second fitting or removal tools supported by a post of a tyre fitting and removing apparatus and being movable at least in a substantially radial direction with respect to a longitudinal axis of the post which extends parallel to a rotational axis of a vehicle wheel, characterized by receiving a first input signal from a first sensor coupled to the first fitting or removal tool, wherein the first input signal indicates a movement or position of the first fitting or removal tool in said substantially radial direction, and providing, based on the first input signal, an output signal causing an actuator coupled to the second fitting or removal tool to move the second fitting or removal tool synchronously to the first fitting or removal tool in said substantially radial direction.

15. The method according to claim 14, further comprising
receiving a second input signal from a second sensor coupled to the second fitting or removal tool, wherein the second input signal indicates a movement or position of the second fitting or removal tool in said substantially radial direction, and
wherein the output signal is provided based on a comparison of the first and second input signals.

\* \* \* \* \*